Dec. 24, 1968 H. A. SHERWOOD 3,418,000

TURNTABLE FOR PHONOGRAPH RECORDS

Filed June 19, 1967

INVENTOR.
HENRY A. SHERWOOD
BY
ARTHUR A. MARCH
ATTORNEY

United States Patent Office 3,418,000
Patented Dec. 24, 1968

3,418,000

TURNTABLE FOR PHONOGRAPH RECORDS

Henry A. Sherwood, Short Hills, N.J., assignor to Electra Associates, Bridgeport, Conn., a partnership Filed June 19, 1967, Ser. No. 646,911
9 Claims. (Cl. 274—39)

ABSTRACT OF THE DISCLOSURE

A turntable for phonograph records of different types having a rotatable platform for supporting phonograph records. A first record centering and retaining member is provided which extends generally upwardly from the center of rotation of the platform. The first record centering and retaining member is of relatively small width for reception in the relatively small centering aperture of a record of a type adapted to fit on the first centering and retaining member. A second record centering and retaining device is provided for centering and retaining records of the type having a relatively larger centering aperture than the records of the type having a relatively small centering aperture adapted to fit on the first centering and retaining member. The second record centering the retaining device is retained on the platform adjacent the first record centering and retaining member and has a plurality of relatively resilient arms extending outwardly and upwardly therefrom. The arms are adapted to center and retain a record of the type having a relatively large centering aperture and to be depressed against the platform by a record of the type having a relatively small centering aperture adapted to receive the first record centering member.

This invention relates to phonograph turntables, and more particularly, to a phonograph turntable which is readily adapted to receive different types of records.

Previous turntables have been adapted to receive different types of records such as 78 r.p.m. records which may have relatively small apertures in the center portion for engagement with a centering knob on the turntable. When records such as 45 r.p.m. records, which usually have relatively larger apertures in the central portion thereof, are used with these previous turntables, it was necessary to employ relatively expensive and cumbersome devices for adapting the turntable for use with this type of record having a relatively large centering aperture. These previous devices usually require some manual adjustment on the part of the user before a different type of record could be accommodated. For instance one well known type of adaptation has been the use of a large removable cylinder which is placed over the central knob of the turntable when it was desired to play records with larger centering apertures. Many previous turntables have used relatively expensive means to adapt the turntable for use with different type records.

It is an object of this invention to provide a phonograph turntable which has relatively simple and inexpensive means for adapting the turntable for use with various type records.

Another object of this invention is to provide such a turntable which is adapted for use with various types of records having different centering aperture sizes that does not require adjustment of the turntable by the user.

It is an additional object of this invention to provide such a turntable which automatically adjusts itself to the type of record desired to be used.

It is a further object of this invention to provide such a phonograph turntable which has a resilient member adapted to be inoperable when the records with relatively small centering apertures are used and adapted to engage relatively large apertures of other type records.

Other objects and advantages will be readily apparent from the following detailed specification and the attached drawings wherein.

Figure 1:
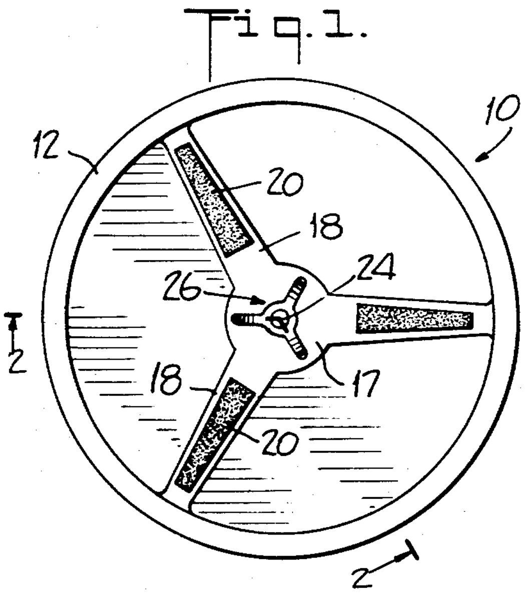
FIGURE 1 is a top view of the turntable of this invention.
Figure 3:
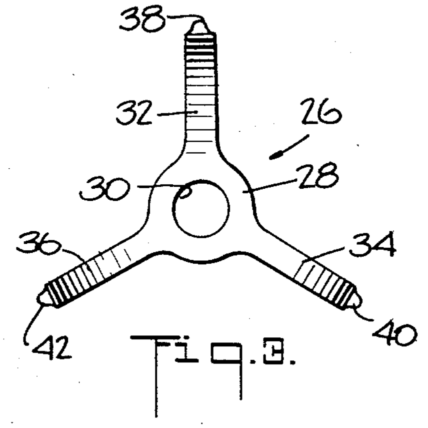
FIGURE 3 is an enlarged top view of the centering spider of the turntable of FIGURE 1.

It has now been found that the foregoing objects and other advantages can readily be attained in a turntable for phonograph records of different types that has a rotatable platform for supporting the phonograph records. A first record centering and retaining member is provided which extends generally upwardly from the center of rotation of the platform, the first record centering and retaining member being of relatively small width for reception in the relatively small centering aperture of a record of the type adapted to fit on the first centering and retaining member. A second record centering and retaining device is provided for centering and retaining records of the type having a relatively larger centering aperture than the records of the type having a relatively small centering aperture adapted to fit on the first centering and retaining member. The second record centering and retaining device is retained on the platform adjacent the first record centering and retaining member and has a plurality of relatively resilient arms extending outwardly and upwardly therefrom. The arms are adapted to center and retain a record of the type having a relatively large centering aperture and to be depressed against the platform by a record of the type having a relatively small centering aperture adapted to receive the first record centering and retaining member.

Advantageously the arms may have generally downwardly extending finger portions on the outer ends thereof for centering and retaining a record of the type having a relatively large centering aperture. In this embodiment the platform has a plurality of apertures adapted to receive the fingers when the arms are depressed by a record of the type having a relatively small centering aperture adapted to fit on the first centering and retaining member.

The second record centering and retaining device may be in the highly desirable form of a spider having a central web portion with an aperture for receiving therein the first record centering and retaining member. In this embodiment the web portion is disposed adjacent the platform and the spider has a plurality of relatively resilient arms extending radially outwardly and upwardly from the web portion so that the arms may be depressed against the platform when certain type records are used.

The web portion of the spider is disposed on and generally in the same plane as the platform and is contiguous about the record centering and retaining member. The web portion may have two or more resilient arms extending radially outwardly and upwardly therefrom. Desirably, the spider is made of relatively flexible metal, however, it may be made out of other suitable materials.

Referring now to the drawings, there is illustrated a turntable, generally designated by the numeral 10, for rotatably supporting different type phonograph records in a highly advantageous and economical manner, having a support platform 12 of disc shape that is adapted to support phonograph records with various size centering apertures. The platform 12 is mounted on a shaft 14 which extends perpendicularly from the center of one side of the platform 12. The shaft 14 is adapted to rotatably mount the turntable 10 in a conventional manner not shown in the drawings. The circumferential periphery of the platform 12 has a downwardly extending cylindrical flange 16 for driving the turntable 10, also in a conventional manner. If desired, the turntable 10 may be driven in a conventional manner by the shaft 14 instead of by means of the cylindrical flange 16.

The upper surface of the platform 12 has a centrally disposed raised web portion 17 and three spaced raised rib portions 18 placed at 120° intervals about the web 17. Three strips of plastic material 20 are disposed on the upper surface of the three rib portions 18 in order to provide a friction area for phonograph records placed on the turntable 10.

In order to accommodate different type records, a knob 24 is provided which extends upwardly from the central portion of the web 17 and which is of suitable size to fit records of a type that have relatively small centering apertures. A spider, generally designated by the numeral 26, has a web portion 28 with an aperture 30 adapted to be fitted over the knob 24 so that the web 28 of the spider 26 abuts the web 17 of the platform 12. The spider 26 has three radially extending arms 32, 34 and 36 which extend outwardly and upwardly from the web 28. The extremities of the arms 32, 34 and 36 have finger portions 38, 40 and 42, respectively, which extend downwardly from the outer ends of the arms and have their free end portions disposed in three apertures 44, suitably positioned in the web 17 of the platform 12. The apertures 44 extend through the platform 12 so that the fingers 38, 40 and 42 may be pressed into these cavities.

Figure 4:
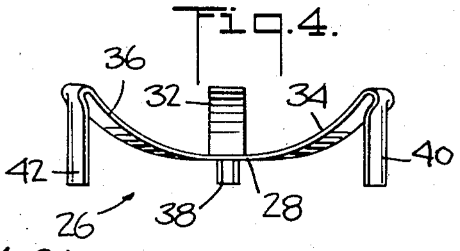
FIGURE 4 is a side elevation view of the spider of FIGURE 3.
Figure 2:
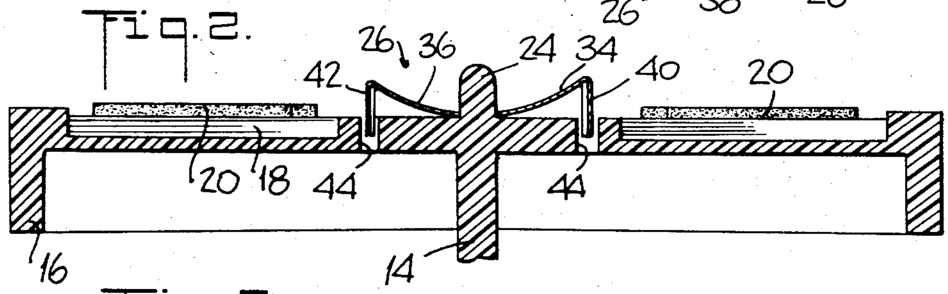
FIGURE 2 is a side elevation view of the turntable of FIGURE 1.
Figure 5:
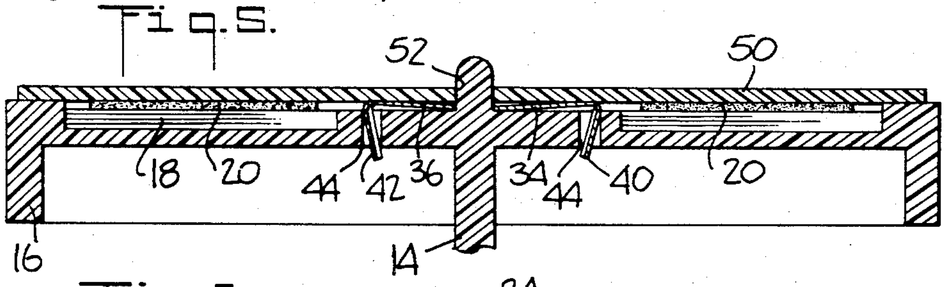
FIGURE 5 is a view similar to FIGURE 2 with a record with a relatively small centering aperture disposed thereon.
Figure 6:
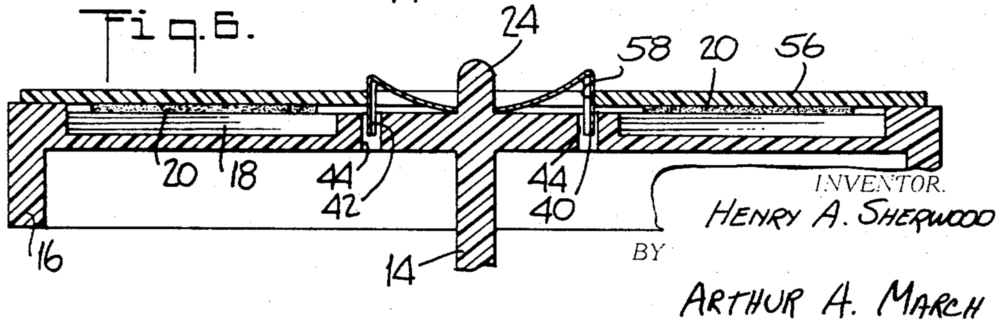
FIGURE 6 is a view similar to FIGURE 5 with a record with a relatively large centering aperture disposed thereon.

As illustrated in FIGURE 4, when it is desired to use the turntable 10 with a record that has a relatively small central aperture which will fit snugly about the knob 24, the record 50, for instance, a conventional 78 r.p.m. record, is placed upon the turntable 10 with the knob 24 disposed in the aperture 52 of the record 50. The weight of the record 50 causes the resilient arms 32, 34, and 36 to bend downwardly so that they are flush with the platform 12 with the fingers 38, 40 and 42 disposed in the apertures 44. Thus by simply placing this type record on the turntable in a simple facile manner, the platform 12 is adapted to receive the record 50 with suitable aperture 52 receiving the knob 24.

When it is desired to use the turntable 10 for records having a relatively larger central aperture, for instance, such as conventional 45 r.p.m. records, the record disc 56 is placed on the turntable 10 without any adjustment being made by the user so that the relatively large aperture 58 in the record 56 is engaged by the fingers 38, 40 and 42 in a highly advantageous manner to securely hold and center the record in place on the turntable 10.

Accordingly, this invention provides a highly advantageous turntable which is adapted to readily receive records with relatively small apertures for engagement with knob 24 or for records with relatively larger apertures for engagement by the fingers 38, 40 and 42. Thus this invention not only provides a very inexpensive and expedient method of adapting a turntable for various type records, it also provides a method of allowing use of various type records without any adjustments being made by the user.

It will be understood that the foregoing description tions may be made thereto without departing from the with the details of exemplary structure is not to be construed in any way to limit the invention, but that modifica- scope of the invention as set forth in the following claims.

Having thus described my invention, I claim:

1. A turntable for phonograph records of different types comprising: a rotatable platform for supporting phonograph records; a first record centering and retaining member extending generally upwardly from the center of rotation of said platform, said first record centering and retaining member being of relatively small width for reception in the relatively small centering aperture of a record of the type adapted to fit on said first centering and retaining member; a second record centering and retaining device for centering and retaining a record of a type having a relatively large centering aperture than the record of the type having a relatively small centering aperture adapted to fit on said first centering and retaining member, said second record centering and retaining device being retained on said platform adjacent said first record centering and retaining member and having a plurality of relatively resilient arm means extending outwardly and upwardly therefrom, said arm means being adapted to center and retain a record of the type having a relatively large centering aperture and to be depressed against said platform by a record of the type having a relatively small centering aperture adapted to receive said first record centering and retaining member and wherein said arm means has arms with generally downwardly extending finger portions on the outer ends thereof for centering and retaining a record of the type having a relatively large centering aperture, and wherein said platform has a plurality of apertures adapted to receive said fingers when said arms are depressed by a record of the type having a relatively small centering aperture adapted to fit said first centering and retaining member.

2. The turntable of claim 1 wherein said second record centering and retaining device is in the form of a spider having a central web portion with an aperture receiving therein said first record centering and retaining member, said web portion being disposed adjacent said platform, and said arms means having a plurality of relatively resilient arms extending radially outwardly and upwardly from said web portion to center and retain a record of the type having a relatively large centering aperture, said arms being positioned to be depressed against said platform when a record of the type having a relatively small centering aperture adapted to receive said first record centering and retaining member is used.

3. The turntable of claim 2 wherein said arms have generally downwardly extending finger portions on the outer ends thereof for centering and retaining a record of the type having a relatively large centering aperture, and wherein said platform has a plurality of apertures adapted to receive said fingers when said arms are depressed by a record of the type having a relatively small centering aperture adapted to fit said first centering and retaining member.

4. A turntable for phonograph records of different types comprising: a rotatable platform for supporting phonograph records; a record centering and retaining member extending generally upwardly from the center of rotation of said platform, said record centering and retaining member being of relatively small size for reception in the relatively small centering aperture of a record of a type adapted to fit on said centering and retaining member; a record centering and retaining spider for centering and retaining a record of a type having a relatively larger centering aperture than the record of the type having a relatively small centering aperture adapted to fit on said centering and retaining member, said record centering and retaining spider having a web portion disposed on said platform adjacent said record centering and retaining member, said web portion having a plurality of relatively resilient arm means extending outwardly and upwardly therefrom, said arm means being adapted to center and retain a record of the type having a relatively large centering aperture and to be depressed against said platform by a record of the type having a relatively small centering aperture adapted to receive said record centering and retaining member and wherein said arm means has arms with generally downwardly extending finger portions on the outer ends for centering and retaining a record of the type having a relatively large centering aperture, and wherein said platform has a plurality of apertures adapted to receive said fingers when said arms are depressed by a record of the type having a relatively small centering aperture adapted to fit said centering and retaining member.

5. The turntable of claim 4 wherein said record centering and retaining spider has a central web portion with an aperture for receiving said record centering and retaining member, said web portion being disposed adjacent and generally in the same plane as said platform, said arm means having a plurality of relatively resilient arms extending radially outwardly and upwardly from said web portion to center and retain a record of the type having a relatively large centering aperture, said arms being positioned to be depressed against said platform when a record of the type having a relatively small centering aperture adapted to receive said record centering and retaining member is used.

6. The turntable of claim 5 wherein said arms have generally downwardly extending finger portions on the outer ends thereof for centering and retaining a record of the type having a relatively large centering aperture, and wherein said platform has a plurality of apertures adapted to receive said fingers when said arms are depressed by a record of the type having a relatively small centering aperture adapted to fit said centering and retaining member.

7. A turntable for phonograph records of different types comprising: a rotatable platform for supporting phonograph records; a record centering and retaining member extending generally upwardly from the center of rotation of said platform, said record centering and retaining member being of relatively small width for reception in the relatively small centering aperture of a record of a type adapted to fit on said centering and retaining member; a record centering and retaining spider for centering and retaining a record of a type having a relatively larger centering aperture than the record of the type having a relatively small centering aperture adapted to fit on said centering and retaining member, said record centering and retaining spider having a web portion disposed on and generally in the same plane as said platform and contiguous about said record centering and retaining member, said web portion having three relatively resilient arms extending radially outwardly and upwardly therefrom, said arms being positioned to center and retain a record of the type having a relatively large centering aperture and to be depressed against said platform by a record of the type having a relatively small centering aperture adapted to receive said record centering and retaining member and wherein said arms have generally downwardly extending finger portions on the outer ends thereof for centering and retaining a record of the type having a relatively large centering aperture, and wherein said platform has three apertures adapted to receive said fingers when said arms are depressed by a record of the type having a relatively small centering aperture adapted to fit said centering and retaining member.

8. The turntable of claim 7 wherein said record centering and retaining spider has a central web portion with a central aperture for receiving said record centering and retaining member, said spider having said relatively resilient arms extend radially outwardly at 120° intervals from said web portion to center and retain a record of the type having a relatively large centering aperture, said arms being positioned to be depressed against said platform when a record of the type having a relatively small centering aperture adapted to receive said record centering and retaining member is used.

9. The turntable of claim 8 wherein said arms have generally downwardly extending finger portions on the outer ends thereof for centering and retaining a record of the type having a relatively large centering aperture, and wherein said platform has a plurality of apertures adapted to receive said fingers when said arms are depressed by a record of the type having a relatively small centering aperture adapted to fit said centering and retaining member.

References Cited

UNITED STATES PATENTS

| | | | |
|---|---|---|---|
| 2,838,315 | 6/1958 | Staar | 274—39 |
| 3,034,795 | 5/1962 | Guest | 274—39 |

FOREIGN PATENTS

| | | |
|---|---|---|
| 818,914 | 8/1959 | Great Britain. |

HARRY N. HAROIAN, *Primary Examiner.*